(12) United States Patent
Paulitschke (10) Patent No.: US 9,234,810 B2
(45) Date of Patent: Jan. 12, 2016

(54) APPARATUS AND METHOD FOR DETECTING THE DEFLECTION OF ELASTIC ELEMENTS

(75) Inventor: Philipp Paulitschke, Munich (DE)

(73) Assignee: Ludwig-Maximilians-Universitaet Muenchen, Munich (DE)

(*) Notice: Subject to any disclaimer, the term of this patent is extended or adjusted under 35 U.S.C. 154(b) by 0 days.

(21) Appl. No.: 14/118,601

(22) PCT Filed: May 10, 2012

(86) PCT No.: PCT/EP2012/002015
§ 371 (c)(1),
(2), (4) Date: Nov. 19, 2013

(87) PCT Pub. No.: WO2012/156050
PCT Pub. Date: Nov. 22, 2012

(65) Prior Publication Data
US 2014/0090487 A1 Apr. 3, 2014

(30) Foreign Application Priority Data

May 19, 2011 (DE) .......................... 10 2011 050 493

(51) Int. Cl.
| G01L 1/24 | (2006.01) |
| G01B 11/16 | (2006.01) |
| G01L 1/04 | (2006.01) |
| B82Y 15/00 | (2011.01) |

(52) U.S. Cl.
CPC .............. *G01L 1/241* (2013.01); *G01B 11/165* (2013.01); *G01L 1/04* (2013.01); *B82Y 15/00* (2013.01)

(58) Field of Classification Search
CPC .... G01B 11/18; G01B 11/16; G01B 2290/25; G01B 11/165; G01L 1/241; G01L 1/04; B82Y 15/00

USPC .............................. 73/800, 862.624, 862.324
See application file for complete search history.

(56) References Cited

U.S. PATENT DOCUMENTS

| 3,458,257 A | 7/1969 | Pryor |
| 3,628,866 A | 12/1971 | Mueller |

(Continued)

FOREIGN PATENT DOCUMENTS

| WO | 2011047259 A1 | 4/2011 |
| WO | 2011047359 A2 | 4/2011 |

OTHER PUBLICATIONS

International Preliminary Report on Patentability dated Nov. 28, 2013 for International Application No. PCT/EP2012/002015. 7 Pages.

(Continued)

*Primary Examiner* — Max Noori
(74) *Attorney, Agent, or Firm* — Eschweiler & Associates, LLC (57) ABSTRACT

Shown are a device (26) and a method for detecting the deflection of a plurality of elastic elements (22), wherein the elastic elements (22) can be deflected out of a rest position against a restoring force and are suitable as resonators and/or for measuring a force acting on a respective elastic element (22). The elastic elements (22) are arranged periodically, The arrangement of the elastic elements (22) is illuminated using light, the coherence length of which is larger than the average spacing of adjacent elastic elements (22). A diffraction image is hereby created of the illuminating light scattered on the arrangement of elastic elements (22), and at least a portion of the diffraction image is detected by an optical sensor (32) directly or after interaction with further optical components. The detected image or image signal is subsequently analyzed in order to determine information relating to the deflection state of the elastic elements (22) therefrom.

20 Claims, 7 Drawing Sheets

(56) References Cited

U.S. PATENT DOCUMENTS

| | | | | |
|---|---|---|---|---|
| 5,508,804 | A * | 4/1996 | Furstenau | 356/477 |
| 7,460,240 | B2 * | 12/2008 | Akcakir | 356/457 |
| 2006/0285850 | A1 * | 12/2006 | Colpitts et al. | 398/108 |
| 2010/0014099 | A1 * | 1/2010 | Christoph et al. | 356/602 |
| 2012/0207800 | A1 | 8/2012 | Abu-Baker et al. | |
| 2012/0322164 | A1 | 12/2012 | Lal et al. | |

OTHER PUBLICATIONS

Drzik, et al. "Large Area Diffraction-Based Inspection of Submicron Periodic Structures." Microelectronic Engineering, 86, 1025-1028. Dec. 25, 2008.

du Roure, et al. "Force Mapping in Epithelial Cell Migration." Proceedings of the National Academy of Sciences, vol. 102, No. 7, Jan. 1, 2005. 7 Pages.

International Search Report dated Jul. 3, 2012 for International Application No. PCT/EP2012/002015. 13 Pages.

Vashist, Sandeep. A Review of Microcantilevers for Sensing Applications. AZojono Journal of Microcantilevers for Sensing Applications, vol. 3, Jun. 2007. 15 Pages.

Jensen, K. et al. "An Atomic-Resolution Nanomechanical Mass Sensor." Nature Nanotechnology, vol. 3, Sep. 2008. 5 Pages.

* cited by examiner

APPARATUS AND METHOD FOR DETECTING THE DEFLECTION OF ELASTIC ELEMENTS

FIELD OF THE INVENTION

The present invention is in the field of micro- or nanosensor technology. In particular, the invention relates to a device and a method for detecting the deflection of a multitude of micro- or nanoscopic elastic elements and to a force sensor and a mass sensor.

BACKGROUND OF THE INVENTION AND RELATED PRIOR ART

Sensors with microscopic or nanoscopic elastic elements are known from the prior art allowing for measuring the smallest forces or resonances up to the GHz range.

If the elastic elements are constructed as resonators, they can be used as a mass detector. The detection principle is based on the detection of a shift of the resonant frequency when particles are deposited on the resonator. The extent of the shift is a measure for the mass of the deposited particle. Due to the extremely small dimensions of the currently producible resonators, even the smallest mass deposits lead to a measurable shift of the resonant frequency, so that by now even the depositing of individual atoms can be measured, cf. "*An atomic-resolution nanomechanical mass sensor*", K. Jensen, *Nature Nanotechnology*, 3, 533, 2008.

However, suitable reading methods are required for sensors of this type, by which the deflection of the elastic elements can be measured. For resonators clamped on one side, as are used for example in the atomic force microscope (AFM), the deflection of a laser beam in total reflection from the AFM bar, the so-called cantilever, is measured. This type of detection of the deflection is here termed "external deflection", as the detection device, i.e. the illumination source and the optical detector for receiving the reflected light, is structurally separated from the actual sensor.

Alternatively, so-called internal detection methods are known, which are also termed "on-chip" methods and in which an integrated tension sensor on the cantilever detects the movement or deformation of the cantilever, cf. "*A Review of Microcantilevers for Sensing Applications*", S. Vashist, A. Zojono, 2007, *Medical News TODAY*, Jun. 24, 2007.

The dimensions of conventional cantilevers lie in the micrometer range. However, if the sensor is to be reduced in size to the nanometer range, the reflection measurement of the laser beam is no longer practically possible on the cantilever, and the only remaining option for the person skilled in the art is electronic on-chip detection, which necessitates complex and expensive reading electronics. However, this must result in the surrendering of a significant advantage of external detection, namely that the sensors, which are subject to wear, can be exchanged simply in the case of a design with external detection, while the detection device itself can be retained.

Cell force sensors are a further class of sensors in which the deflection of microscopic or nanoscopic elastic elements is detected and by use of which the forces exerted by biological cells shall be measured. A force sensor of this type is known from Olivia du Roure et al., "*Force mapping in epithelial cell migration*", *Proceedings of the National Academy of Sciences of the United States of America*, 102(7):2390-2395, 2005. The force sensor comprises a multitude of vertical columns which are fastened with a lower end on a horizontal substrate and have an upper free end. The columns and the substrate consist of polydimethylsiloxane (PDMS), i.e. an elastomeric material. During the force measurements, the cells are located on the surfaces of a plurality of adjacent columns. The forces exerted by the cells lead to a deflection of the columns out of their rest positions, which can be detected optically. In the case of a known spring constant of the columns, it is then possible to deduce the cell force from the deflection.

Also with this type of sensor, the currently known type of detection of the deflection of the elastic elements places limits on miniaturisation, as the optical resolution of a typically used microscope is limited by diffraction effects.

Furthermore, it is barely possible from a practical point of view to detect the cell forces of more than a few individual cells at the same time using current force sensors. This means that with currently available methods and devices, it is very complex to obtain significant statistics about cell forces.

In summary, it is therefore seen that in the case of both the described mass sensors and force sensors, the detection of the deflection of the elastic elements becomes more difficult, the more the elastic elements are miniaturised and the greater the number of elastic elements is, whose deflection shall be detected.

SUMMARY OF THE INVENTION

The invention is therefore based on the object of providing a method and a device for detecting the deflection of a plurality of elastic elements, which allow a further miniaturisation and increase of the number of elastic elements with as little outlay as possible.

An apparatus for determining cell forces and an apparatus for detecting the mass and/or concentration of particles are described, which make use of a device according to the invention. Advantageous developments are also specified.

The method according to the invention allows the detection of the deflection of a plurality of elastic elements which are arranged periodically and which can be deflected out of a rest position against a restoring force. In the method according to the invention, this arrangement of the elastic elements is illuminated using light, the coherence length of which being larger than the average spacing of adjacent elastic elements. A diffraction image is generated of the illuminating light scattered by the arrangement of elastic elements, and at least a portion of the diffraction image is detected by an optical sensor directly—or after interaction with further optical components. The detected image, image signal or measurement signal is analysed in order to determine information relating to the deflection state of the elastic elements therefrom.

Unlike in the described prior art, in which for example a normal optical reflection image of the column heads of a force sensor or the deflection of a laser beam reflected by a cantilever was detected, in the method according to the invention, a diffraction image of the multitude of elastic elements is generated.

As mentioned above, the method according to the invention is dedicated specifically to the detection of the deflection of microscopic or nanoscopic elastic elements, i.e. elements whose smallest dimension is for example less than 10 µm and will in many cases even lie in the range of a few 100 nm or lower. As the elastic elements are arranged periodically, they form a type of Bragg lattice, at which the illuminating light can be scattered. In this case, the diffraction image contains Bragg reflections of at least of first order.

Note further that the light source for illumination and the optical sensor are macroscopic components and are typically arranged at a macroscopic distance from the arrangement of elastic elements. Thus, it is clear that the diffraction image on which the detection is based corresponds to the farfield of the diffracted light, i.e. a so-called Fraunhofer diffraction pattern which corresponds to the Fourier-transform of the diffracting object. In order to assume a Fraunhofer diffraction pattern, it is typically sufficient if the distance between the arrangement of elastic elements and the optical sensor lies in the double-digit micrometer range, which will be the case in practical applications. Simply put, the detection method of the invention is based to some extent on the fact that the detection of the deflection is carried out not in real space, but rather in Fourier space.

Detection in Fourier space has a range of very significant advantages. One advantage lies in the fact that the miniaturisation and the higher degree of integration, i.e. the increased number of elastic elements does not make the detection more difficult or more complex, but rather in many respects even makes it easier, as is explained in more detail hereinafter. In particular, by using a diffraction image, external detection can be retained even in the case of extremely small structures, i.e. the detection device is not an integral constituent of the arrangement of elastic elements. This is extraordinarily advantageous, because in this manner, sensors which make use of such elastic elements, such as for example force sensors or mass sensors can be exchanged simply and cost effectively, without the detection apparatus being affected thereby.

A further particular advantage lies in the fact that certain statistical characteristics of the deflection of a multitude of elastic elements in Fourier space can be determined in a significantly simpler manner and in a case described below can even be detected using a simple intensity measurement.

In an advantageous embodiment, the elastic elements are formed by column-like elements, which are each fastened with a lower end on a substrate and have an upper free end. In this case, the diffraction image mentioned above is formed by the light scattered on the upper ends of the column-like elements. An arrangement of elastic columns of this type is known in the prior art as a force sensor, by which for example forces of biological cells have been investigated. However, the deflections of the individual columns were in this case typically observed with the aid of a conventional microscope. This means that the analysis outlay increases with an increasing number of columns, and that limits are placed on miniaturisation by diffraction effects. These difficulties do not exist in connection with the detection method of the present invention. Furthermore, a similar sensor design can also be used as a mass sensor, as is described in more detail below.

In an advantageous embodiment, the intensity of at least one Bragg reflection of at least first order is determined and used to estimate the average deflection of the elastic elements. The term "estimate" is to be understood broadly here and includes both an actual measurement and a qualitative estimate, for example whether a limit value is exceeded or the like. As is explained in more detail below, the intensity of a Bragg reflection drops if the scattering elements, in this case the elastic elements, are deflected out of their periodic rest position. In this respect, the intensity of a Bragg reflection is a measure for an average deflection of the elastic elements. This means that by means of a single intensity measurement on a predetermined Bragg reflection, it is possible to directly determine how far on average the elastic elements are deflected from their rest positions. In many applications, it is precisely this information which is of interest.

This is for example the case for a force sensor with column-like elements, between which or on the upper ends of which biological cells are located. The cells can exert forces onto the column-like elements and as a result tilt the same out of their rest position and the underlying force can be reconstructed by the detection of the deflection of the respective column. If one is concerned not with the behaviour of individual cells, but rather with a statistical behaviour, for example to determine the average activity or vitality of cells under certain conditions, the detection and analysis outlay multiplies proportionally with the size of the statistical ensemble.

By contrast, with the detection method of the invention, the average deflection of the elastic elements, which for their part is a measure for the activity and vitality of the cells, can be estimated directly by means of the intensity of a certain Bragg reflection. A very promising application for this consists in investigating the action of certain medicines or pharmaceutical active substances on cells. Using the detection method of the invention, it is for example very simple, after adding a medicine or a pharmaceutical active substance, to determine whether the activity or vitality increases, remains constant or decreases due to the addition. One advantage of this detection method consists in the fact that it can be carried out on a highly integrated force sensor with thousands of columns and a large number of cells simultaneously, and thus a statistically significant behaviour can be detected with a single intensity measurement. Actually, the accuracy of the detection increases over the intensity of individual Bragg reflections with an increasing number of elastic elements. Thus, this method is ideal for sensors with a large number of elastic elements. The term "estimate" indicates that it is not necessarily an average deflection of the elastic elements as a concrete measured value for example in $\mu m$ which is determined. Instead, relative changes of the intensities, which relate to comparative measurements, can be called upon in order to make a statement about the vitality. Although in this case, the deflection is not determined concretely, it is nonetheless "estimated" implicitly and qualitatively.

A further advantage of this embodiment is that only an amplitude-sensitive detection is required, but not a frequency-sensitive measurement, which generally necessitates expensive and complex evaluation electronics. A frequency-sensitive, i.e. time-resolved measurement would also place limits on the maximum detectable frequencies. This is not the case for a pure intensity measurement, instead resonances with frequencies up to the GHz range can be detected.

The described advantages can also be utilised in other applications in which average deflections of elastic elements are of interest. For example, resonances of vibrations of elastic elements can be detected via the average deflection. Here, for example the arrangement made up of elastic elements can be excited using varying frequencies. If the excitation frequency matches a resonant frequency of the arrangement, this leads to an increase of the average deflection and thus to a detectable drop in the intensity of a Bragg reflection. This also corresponds to an "estimate" of the average deflection of the elastic elements, even if the deflection is not necessarily explicitly determined, rather for example is only determined to the extent that a distinction is made between resonance and non-resonance or the relative quality factor of resonances is determined.

In this context, the above-described sensor design, in which the elastic elements are formed by vertical columns has proven to perform surprisingly well. At first glance, one would assume that the resonance of such a column sensor arrangement essentially corresponds to that of a single column, but with a quality factor which is lower than that of a single column, because the columns and therefore their individual natural frequencies are not exactly identical for production reasons, as a result of which the resonance of the sensor as a whole should obtain an increased spectral range compared to the resonance of individual oscillators. The inventor has determined, however, that in the given miniaturisation of the sensor design, the resonance modes do not correspond to the vibration modes of individual columns, but rather that a multitude of vibration modes of the entire system of columns occurs, which leads to substantially narrower resonances than one would have expected from the superposition of individual decoupled columns, and which actually are typically narrower than the resonance of a separate identical column. The inventor suspects that in the case of sufficient miniaturisation, i.e. in the case of distances of only a few micrometers, the columns are coupled by ambient air and/or via the substrate, so that natural frequencies of a system made up of coupled oscillators result as resonances. A particular and surprising result however is the fact that the spectral range of these resonances is unexpectedly low, which allows an exceptionally precise resonance measurement.

One can for example utilise the exceptionally beneficial combination of the quality factor of the vibration modes and the simplicity of the detection method in the measurement of the concentration of predetermined particles. For example, the elastic elements can be coated at least in certain sections with a material, on which the previously described particles are selectively deposited. In the above-described example of a sensor with a multitude of column-like elements, the end faces of the upper ends of the column-like elements could for example be coated with a material of this type. Depending on the concentration of the associated particles in the ambient atmosphere, more or less particles are deposited, which will lead to a change of the resonance spectrum. For example, it is to be expected that the deposition of a few particles initially leads to a "detuning" of individual resonators and thus only to an attenuation of the resonance at the same resonant frequency. By contrast, different resonance modes will occur in the case of a large number of deposits. It is even possible that the depositing of a single particle on the column changes the entire coupled mode, so that individual particles can also lead to a resonance shift. The associated changes of the resonance spectrum can be determined experimentally and the concentration detector calibrated accordingly.

Additionally or alternatively, the mass of deposited particles can be determined on the basis of at least one detected resonant frequency. Depending on the mass of the deposited particles, different resonance spectra will result, which in turn can be determined simply by drops in intensity of Bragg reflections. A very sensitive mass detector is provided as a result. As the arrangement made up of elastic elements can be miniaturised very well, even the smallest masses can also be measured very accurately.

As has already been mentioned at the beginning, valuable information about the deflection of the elastic elements can be obtained by directly investigating the diffraction image of the coherently illuminated elastic elements, for example in the form of a simple intensity measurement of individual Bragg reflections. The method is not limited to this however. As the Fraunhofer diffraction pattern corresponds to the Fourier transform of the scattering structure, i.e. the elastic elements in their current deflection state, and the Fourier transform is a bijective function, all of the information about the deflections of each separate elastic element is still fundamentally contained in the Fraunhofer diffraction image. In this respect, the evaluation of the diffraction image is of course not limited to the measurement of the intensity of Bragg reflections, the latter is only a particularly simply and precisely obtainable for the average deflection of the elastic elements, which is of particular significance for mass detection or detecting the vitality of cells. Instead, however, depending on the underlying physical or biological question posed, other information can be determined from the diffraction image.

In a further embodiment, it is suggested to transform the Fraunhofer diffraction image by means of interaction with an optical system, for example a lens, from the Fourier space to the position space or original space, in order to again obtain a "normal" image of the arrangement of elastic elements. The optical system can for example be a collimating lens, which is used as a so-called "Fourier optical system". The electrical field of the diffraction image located in the image-side focal plane in this case corresponds to the spatial Fourier transform of the electrical field in the object-side focal plane.

The use of such a "Fourier optical system" makes it possible to produce an enlarged real image without a microscope having to be used, and thus constitutes a very cost-effective alternative for a conventional design employing a microscope. A further advantage of this embodiment is that a device which operates in Fourier space (for example in order to measure intensities of individual Bragg reflections) can be equipped rapidly and simply in order to obtain a "real optical" image of the arrangement of elastic elements. In this manner, one obtains the advantages of both detection methods in one and the same device with minimal additional outlay on equipment with respect to a device based on diffraction pattern detection only.

Regardless of whether the above-described arrangement of column-like elastic elements should be used as a force sensor or as a mass sensor, it is advantageous if the cross section of the column-like elements is larger at the upper end than at the lower end, i.e. the column-like elements have a fluted shape. Due to the small cross section in the region of the lower end, a relatively small spring constant can be obtained, whilst a relatively large cross-sectional region of the upper end can be provided, on which the illuminating light can be scattered, which increases the intensity of the diffraction image.

Preferably, the diameter at the lower end of the column is smaller than 500 nm, particularly preferably smaller than 200 nm and in particular smaller than 100 nm. As a result, very small restoring forces with regard to the tilting of the column-like elements can be achieved. If the arrangement made up of column-like elements should be used as cell force sensor, even very small cell forces can be measured therewith.

In an advantageous development, the column-like elements have the shape of a truncated cone standing on the narrow end, the half opening angle of which being between 0.1° and 7°, preferably between 0.5° and 3°. "Half opening angle" is understood to mean the angle between the cone axis and an enveloping line of the truncated cone, which results from the section of a plane containing the cone axis with the enveloping surface.

The following preferably applies for the spring constant k of the columns:

$$k = \frac{F}{\Delta x} \leq 10 \text{ mN/m, particularly preferably} \leq 1 \text{ mN/m,}$$

where $\Delta x$ is the deflection of the upper end of the column-like element in the horizontal direction and F is a horizontal force which acts on the upper end of the column-like element. Such low spring constants in turn allow the measurement of extremely small forces and are therefore advantageous in the context of cell force measurements.

Preferably, the substrate and the column-like elements consist of a solid-state material. The solid-state material can be crystalline, polycrystalline or amorphous and in particular formed by a metal or a semiconductor material. By using the solid-state material, deformations in the substrate, as occur in the case of elastomeric force sensors, can substantially be excluded.

In an advantageous development, the material of the force or mass sensor is GaAs, Si, SiN or $SiO_2$. These are materials which are used routinely in semiconductor technology. For the purposes of the invention, this is important because—in addition to the suitable mechanical properties of these materials—it is possible to take advantage of the mature production methods from the semiconductor industry. Thus, when using methods which are known per se from semiconductor technology, nanostructures can be produced with exceptional precision and reproducibility, and this can be done at exceptionally inexpensive costs.

In the event that a cell force measurement is intended, the solid-state material is preferably biocompatible, so that the cells or microorganisms are not damaged by contact with the material. Alternatively, the surface of the force sensor to be exposed to the cells can be treated or coated at least to some extent, in order to create biocompatibility.

In an advantageous embodiment, the length of the columns is between 3 µm and 15 µm, preferably between 4 µm and 12 µm and particularly preferably between 4 µm and 10 µm. The most suitable length depends on the size of the cells investigated and the underlying biological or medical questioning.

The most suitable column geometry for mass detection results from the combination of a small column mass, a low spring hardness, a low damping or large vibration amplitude and depends on the mass of the particle to be detected.

A particular advantage of the above-described mass or force sensor is that it can be produced using established lithographic technologies in a multitude of different configurations without too large an additional effort, so that it is even possible from economic viewpoints to offer a multitude of differently configured mass or force sensors for different analytes, cell types or experiments. In this case, the cross-sectional shape of the columns can be chosen freely.

Preferably, the column-like elements are arranged in a rectangular or hexagonal lattice structure on the substrate, the difference of lattice constant of the lattice and the cross section of the column at the lower end, that is to say the intermediate space between adjacent columns, preferably being between 1 µm and 10 µm.

Furthermore, the number of column-like elements on the force sensor is preferably at least 100, particularly preferably at least 1000 and even more preferably at least 5000. The greater the number of column-like elements, the sharper are the Bragg reflections. In this respect, the detection—unlike in the prior art—even becomes to some degree simpler with an increasing number of elastic elements.

Furthermore, the invention relates to a device for detecting the deflection of a plurality of elastic elements, which can advantageously be applied in a method according to one of the above-described developments. The device comprises a receptacle for accommodating a sensor with a plurality of elastic elements, a light source, which is or can be arranged such that it can illuminate a sensor arranged in or on the receptacle in such a manner that a diffraction image is generated by light scattered on the elastic elements, an optical sensor, particularly an image sensor, which is suitable for receiving at least a portion of the diffraction image or an image which was produced by interaction of the diffraction image with further optical components, and a control which is suitable for determining information relating to the deflection state of the elastic elements of the sensor from the received image or image portion.

Further, the invention relates to an apparatus for determining cell forces, comprising: a cell force sensor, which comprises a plurality of column-like elements each fastened at their lower end on a substrate and having an upper free end, and a device for detecting the deflection of the column-like elements in accordance with the manner described above. The cell force sensor can in this case be constructed in accordance with any of the above-described advantageous types.

Further, the invention relates to an apparatus for detecting the mass and/or concentration of particles, comprising: a mass sensor, which comprises a plurality of column-like elements each fastened at their lower end on a substrate and having an upper free end, the upper ends of the columns being suitable or functionalised for the deposition of particles to be detected, and a device for detecting the deflection of the column-like elements in accordance with the manner described above. Here also, the mass sensor can be constructed in accordance with any of the above-described types.

SHORT DESCRIPTION OF THE FIGURES

Further advantages and features of the invention become apparent from the following description in which the invention is explained on the basis of exemplary embodiments with reference to the attached drawings. In the figures:

FIG. 1 (a) shows a schematic illustration of a living cell in a natural extra-cellular matrix, FIG. 1 (b) shows a schematic illustration of a living cell which is arranged between the column-like elements of a force sensor.

DESCRIPTION OF PREFERRED EMBODIMENTS

Figure 1A:
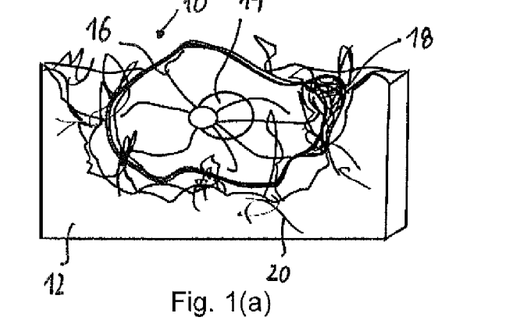

In the following, the method according to the invention is explained by way of example with reference to cell force measurements. To explain the principle of cell force measurement, reference is first made to FIG. 1 (a), in which a cell 10 is schematically illustrated in a natural extra-cellular matrix 12. The cell 10 has a cell nucleus 14 and a cytoskeleton with microtubules 16 arranged in a star-shaped manner and an actin cortex 18. One can think of the natural extra-cellular matrix 12 as a microtopography which is covered with nanostructures, schematically illustrated with reference number 20. Quantitative experiments can only be carried out in natural surroundings with difficulty, whilst investigations on planar surfaces neglect the important mechanical stimulus which occurs in the natural surroundings.

Figure 1B:
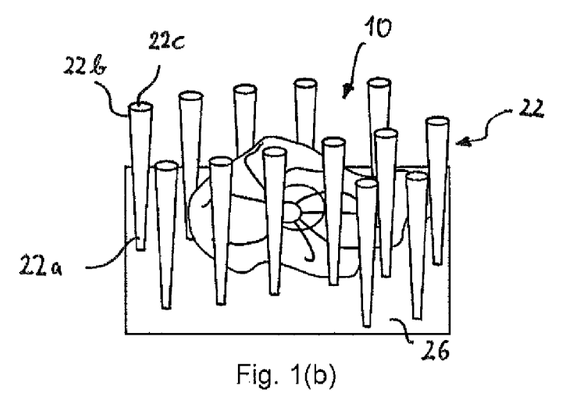

FIG. 1 (b) is a schematic illustration of the cell 10 which is arranged between the column-like elements 22 of a force sensor 24, which are simply termed "columns" in the following. In the force sensor 24, the columns 22 are fixed with their lower end 22a on a substrate 25. The upper end 22b of the columns 22 is free, so that the columns can be tilted out of their vertical rest position when the cell 10 exerts a force onto them. According to this principle, the cell forces are measured locally, i.e. at the location of the respectively relevant column 22.

The columns 22 of the force sensor 24 therefore have a double function, in that they on the one hand indicate the cell force by means of the degree of tilting out of their rest position and on the other hand simulate an extra-cellular matrix for the cell 10 due to their restoring force and therefore generate similar mechanical stimuli for the cell, as would be the case in natural surroundings.

Figure 2:
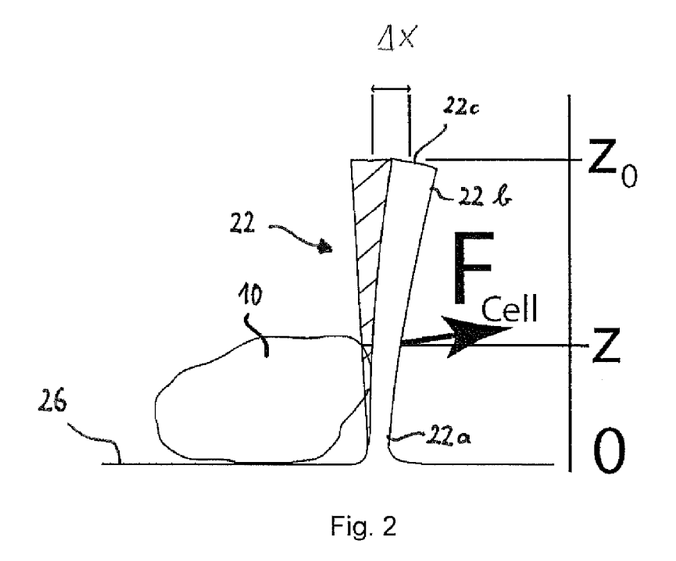
FIG. 2 shows a schematic illustration of the interaction of a cell with an exemplary column of a force sensor, FIG. 3 (a)-(c) shows electron microscope images of force sensors according to the invention.

In FIG. 2, the functional principle of force measurement is illustrated in more detail with reference to a single column 22. As can be seen in FIG. 1(b) and FIG. 2, each column 22 has a conical shape in which the lower end 22a has a smaller diameter than the upper end 22b. In the preferred force sensor 24, the diameter at the lower end 22a of each column 22 is only 500 nm or less, in preferred embodiments only 200 nm or even 100 nm or less. This has the consequence that the column 22 predominantly bends to the side in the region of the lower end 22a when the cell 10 exerts a horizontal force $F_{cell}$ on the column 22, whilst the deformation of the column 22 is comparatively small in an upper section. The measured value for the force sensor 24 is the deflection $\Delta x$ of the upper section 22b of the column, which approximately corresponds to a torque which is exerted by the cell 10 onto the column 22. In order to determine the force actually acting, the torque must be divided by the lever arm. As can be seen from FIG. 2, the lever arm depends on the height z above the substrate 25, in which the cell 10 pushes against the column 22 (or pulls on the same). The lever arm can be detected experimentally at least approximately in a manner not described here.

The deflection of the column 22 out of its rest position is conventionally detected by light which is reflected by the surface or end face 22c of the column 22 on the upper end 22b thereof. The reflected light is the conventionally imaged via a microscope arrangement onto an image sensor. With a suitable analysis program, the deflection of every individual column 22 can be determined and converted into an associated local force. In this manner, the cell forces can be determined very precisely.

In some applications, it may however be the case that one is actually not interested in the concrete behaviour of individual cells, but rather on the statistical behaviour of a multitude of cells. One example for this is the investigation of how the addition of a certain active substance, for example a medicine, affects the activity or vitality of the cells. In this case, one would therefore not be interested in the current cell force of an individual cell 10, but rather in an average value of a sufficiently large statistical ensemble. This is where the conventional detection method, in which the deflection of each individual column 22 is measured, quickly collides with the limits of practicability.

Figure 4:
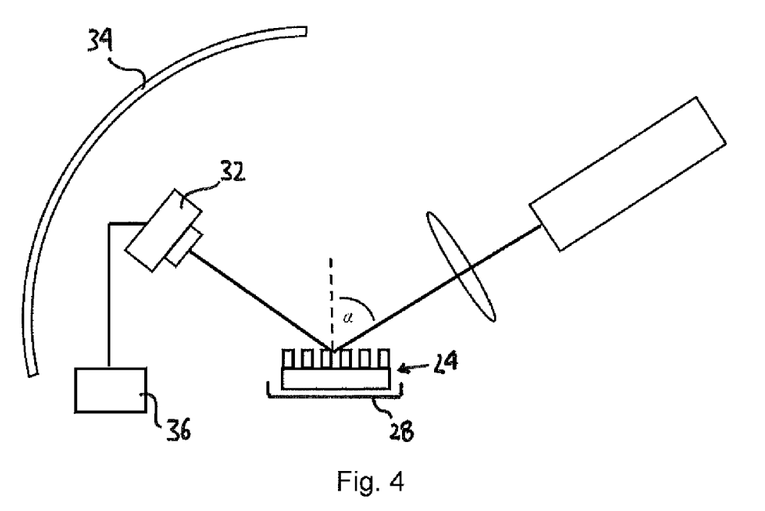
FIG. 4 shows a schematic view of a device for detecting the deflection of a plurality of elastic elements according to an embodiment of the invention.

In order to avoid these difficulties, according to the invention, instead of the conventional direct optical microscope imaging, a diffraction image of the force sensor 24 is created and detected. With reference to FIG. 4, a device 26 is used for this, which comprises a receptacle 28 which is suitable for accommodating the force sensor 24. The receptacle 28 can be any section or any component, on or in which the force sensor 24 can be arranged.

Furthermore, the device 26 comprises a light source 30, which in the exemplary embodiment shown is a laser. The light source 30 must have a coherence length which at least exceeds the average spacing of adjacent columns 22 of the force sensor 24, in order to create a representative diffraction image. However, in the case of the microscopic or nanoscopic dimensions of the force sensor 24, this is not a very demanding requirement for the light source 30, so that the use of a laser as light source is not obligatory, rather other light sources 30 may also be considered. The light source 30 is arranged at an angle $\alpha$ in relation to the force sensor 24 or the substrate 25 thereof.

Furthermore, the device 26 comprises an optical sensor which is suitable for receiving at least a portion of the diffraction image. In the exemplary embodiment shown, the optical sensor is formed by a CCD camera 32. The CCD camera can be positioned in such a manner that it receives selected Bragg reflections and allows an intensity measurement thereof. Additionally, a virtual monitor is illustrated schematically with reference number 34, to which reference is made below. Finally, the device 26 contains a control 36 which is suitable for carrying out the method described herein.

The distance between the CCD camera 32 and the force sensor 24 in the design 26 of FIG. 4 lies in the single- to double-digit centimeter range. Compared with the order of magnitude of the scattering structures, in this case the end faces 22c on the upper ends 22b of the columns 22, this is therefore a large distance, so that in the region of the CCD camera 32, the diffraction image corresponds to the farfield or the Fraunhofer diffraction pattern, which for its part corresponds to the two-dimensional Fourier transform of the field distribution directly behind the diffraction structure. Even in a miniaturised embodiment, this would still apply with satisfactory accuracy if the distance between the force sensor and the CCD sensor were to lie only in the double-digit micrometer range.

The relationship between a function $f(x, y)$ in two variables x and y and their Fourier transform $F(k_x, k_y)$ is summarised in the following equations:

$$f(x, y) = \frac{1}{(2\pi)^2} \int_{-\infty}^{\infty} \int_{-\infty}^{\infty} F(k_x, k_y) e^{-i(k_x x + k_y y)} dk_x dk_y$$

$$FT\{f(x, y)\} = \int_{-\infty}^{\infty} \int_{-\infty}^{\infty} f(x, y) e^{i(k_x x + k_y y)} dx dy = F(k_x, k_y).$$

Figure 5:
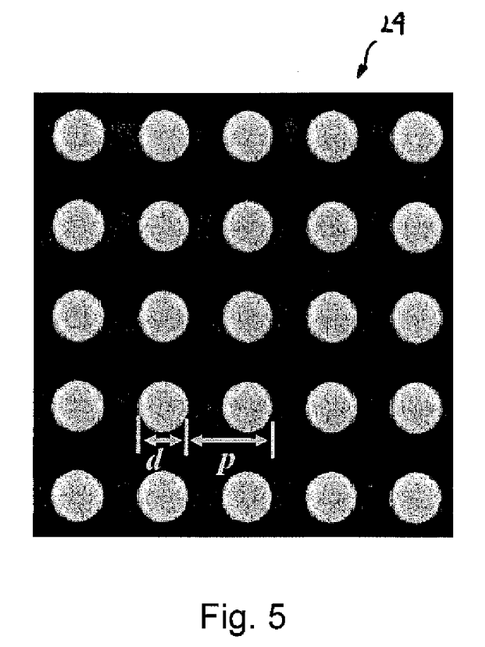
FIG. 5 shows an electron microscope image of a plan view onto an arrangement of 5×5 elastic columns.

The end faces 22c of the upper ends 22b of the columns 22 of the force sensor 24 are here regarded as scattering structure. FIG. 5 shows a plan view onto these end faces 22c in an electron microscope picture of a force sensor with 5×5 columns in a square arrangement, in which the column diameter at the upper end 22b is d=1 μm and the period is p=2 μm. The scattering structure a(x, y), which one would also term "opening function" in analogy to the diffraction at multiple slits and which is formed by an arrangement of N×M scattering surfaces with a circular diameter d and a period p, can be formulated mathematically as a convolution of a square matrix made up of δ functions and a circular aperture function $a_e(x, y)$:

$$a(x, y) = a_e(x, y) \otimes \sum_{n=0}^{N-1} \delta(x/p - n) \sum_{m=0}^{M-1} \delta(y/p - m)$$

$$= a_e(x, y) \otimes p^2 \sum_{n=0}^{N-1} \delta(x - np) \sum_{m=0}^{M-1} \delta(y - mp)$$

$$\text{with } a_e(x, y) = \begin{cases} 1 & \text{for } x^2 + y^2 = (d/2)^2 \\ 0 & \text{else} \end{cases}$$

Here, the symbol "⊗" represents the convolution. The Fourier transform of $a(x, y)$, i.e. the Fraunhofer diffraction pattern can consequently be calculated as follows:

$$FT\{a(x, y)\} = E(k_x, k_y)$$

$$= p^2 A_e(k_x, k_y) \sum_{n=0}^{N-1} (e^{-ik_x p})^n \sum_{m=0}^{M-1} (e^{-ik_y p})^m$$

$$= p^2 A_e(k_x, k_y) \frac{e^{-ik_x pN} - 1}{e^{-ik_x p} - 1} \cdot \frac{e^{-ik_y pN} - 1}{e^{-ik_y p} - 1}.$$

Using $$\sin(\alpha) = \frac{e^{i\alpha} - e^{-i\alpha}}{2i}$$

the following results for the intensity distribution $I(k_x, k_y)$:

$$I(k_x, k_y) \propto E(k_x, k_y) \cdot E^*(k_x, k_y) =$$

$$p^4 A_e^2(k_x, k_y) \left(\frac{\sin\left(N\frac{k_x p}{2}\right)}{\sin\left(\frac{k_x p}{2}\right)}\right)^2 \left(\frac{\sin\left(M\frac{k_y p}{2}\right)}{\sin\left(\frac{k_y p}{2}\right)}\right)^2$$

Figure 6:
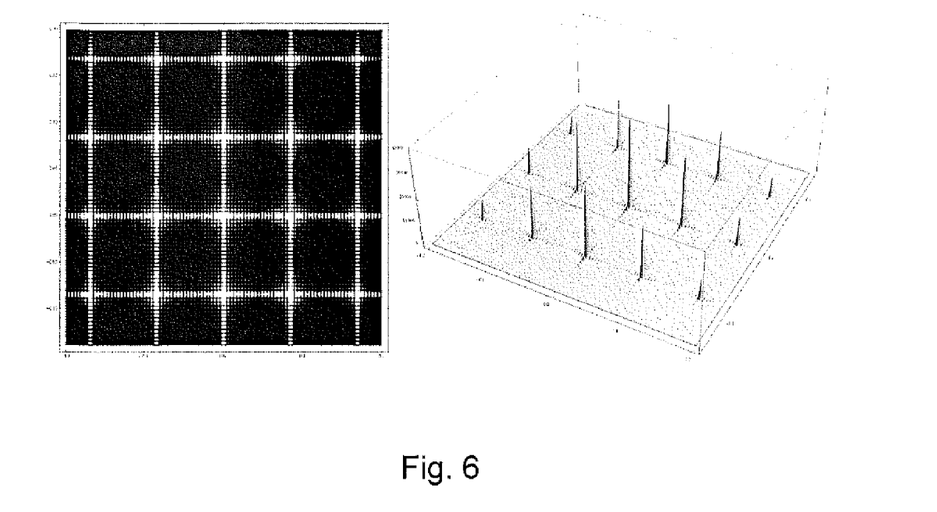
FIG. 6 shows a contour graph and a three-dimensional illustration of the intensity distribution of the Fourier transform of a square column matrix.

Here, the Fourier transform of the disc function FT$\{a_e(x, y)\}=A_e(k_x, k_y)$ is the known Bessel function 1. Type of order 1. FIG. 6 shows the intensity $I(k_x, k_y)$ resulting from the above equation, which corresponds to an image onto the virtual spherical monitor 34 of FIG. 4 with a radius s. In this case, the following parameters were used: N=M=20, p=3 µm, d=1 µm, λ=633 nm, α=0 and s=40 cm.

As can be seen from FIG. 6, a plurality of intensity maxima result as a diffraction image, which are termed "Bragg reflections" in analogy to solid-state physics. The relatively sharp intensity peaks which can be seen in FIG. 6 are a consequence of the periodicity of the columns 22 of the force sensor 24. The greater the number of columns 22, the sharper are the intensity maxima on the Bragg reflections. When the columns 22 are deflected out of their rest position by cell forces, the periodicity of the scattering structure is disturbed and it is to be expected that the intensity of the diffraction maxima decreases. This effect is generally known from solid-state physics and can be quantified by the so-called Debye-Waller factor. The Debye Waller model was developed in order to investigate the intensity of a Bragg reflection as a function of the deflection of an atom in a crystal structure out of the rest position. In this model, it is assumed that due to thermal excitation, each atom can be moved about its equilibrium position independently of the other atoms and its scattering cross section is retained. If $\langle u^2 \rangle$ is the average quadratic displacement of the atom and G is the reciprocal lattice vector, the following dependence results according to the Debye-Waller model:

$$I = I_0 \exp(-\tfrac{1}{3}\langle u^2 \rangle)G^2)$$

Here, $I_0$ is the intensity of the Bragg reflection in the case of vanishing atom movement, i.e. at very low temperatures. The intensity of a Bragg reflection therefore decreases exponentially with the square of the average deflection. Although this model was developed in order to describe the temperature dependence of the intensity of coherently elastically scattered radiation in a crystal lattice, a similar behaviour of the intensity should also result in the case of other deflectable scattering elements, such as for example the columns 22 of a force sensor 24, as long as the coherence length of the light is sufficiently large. The inventor has experimentally verified this assumption in the case of a force sensor of the type shown in FIG. 3.

Figure 7:
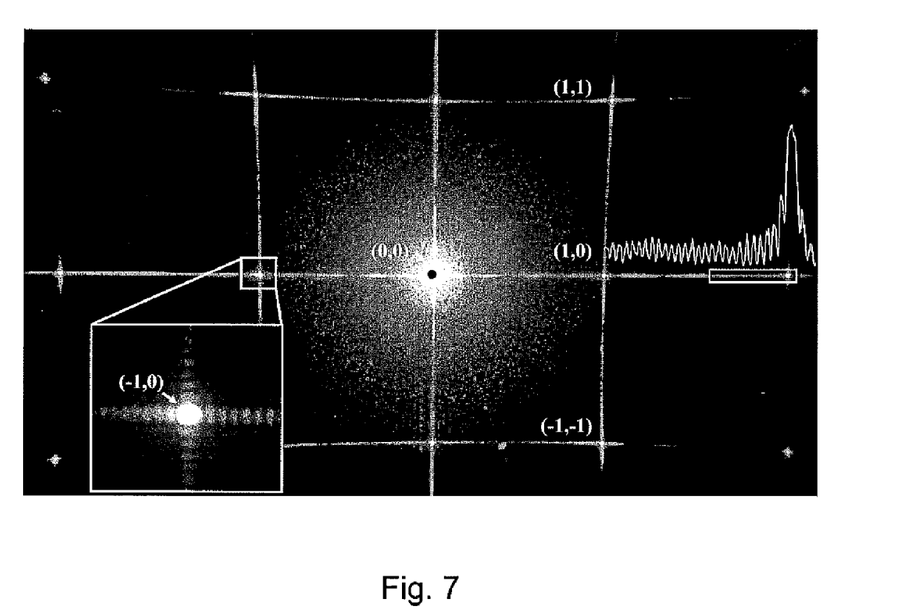
FIG. 7 shows the diffraction image of a force sensor with 80×80 columns.

FIG. 7 is the diffraction image which was taken with a real image sensor (not shown), which was arranged similarly to the spherical virtual monitor 34, but had a planar shape. The image shows a diffraction image of a force sensor with 80×80 columns, which was illuminated by a red laser. The orders of diffraction, i.e. the Bragg reflections are numbered in round brackets. Herein, the diffraction order (0,0) corresponds to the simple back reflection which does not contain any important information about the deflection state. The intensities of the further Bragg reflections of at least first order by contrast directly represent the disorder in the scattering structure, i.e. the average deflection of the columns 22 of the force sensor 24. The Bragg reflection (−1,0) is illustrated in an enlarged manner in FIG. 7. Furthermore, in the right region of the image, a profile illustration of the intensity distribution in the region of the rectangle located therebelow is illustrated with the light-coloured line.

Figure 8:
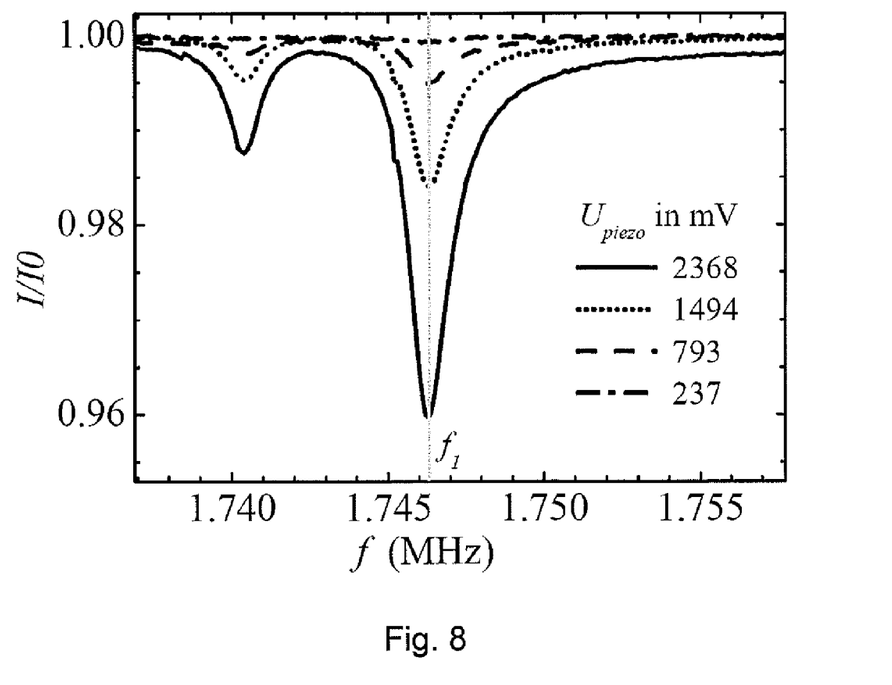
FIG. 8 shows the relative intensity $I/I_0$ of a Bragg reflection as a function of a driving frequency of a piezoelectric element.

FIG. 8 shows the relevant intensity values $I/I_0$ as a function of a driver frequency, with which the force sensor 24 was excited by a shear piezo element. As can be seen from FIG. 8, the relative intensity $I/I_0$ decreases in the range of somewhat above 1.746 MHz, which represents an increased average deflection of the columns and can be traced back to an increased vibration amplitude or a resonance. In FIG. 8, the relative intensities $I/I_0$ are shown for four cases with different levels of excitation, i.e. different levels of voltage amplitude which is applied at the piezo element. As expected, the intensity of the resonance is the stronger, the larger the piezo voltage is, because a larger piezo voltage entails larger deflection amplitudes.

Figure 9:
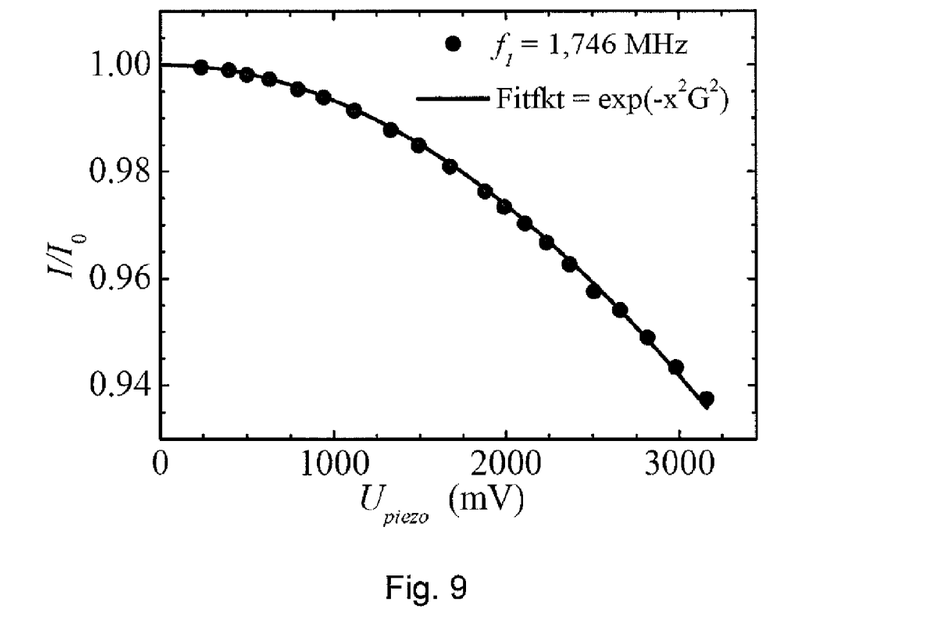
FIG. 9 shows the relative intensity $I/I_0$ of a Bragg reflection as a function of the driving voltage of a piezoelectric element.

In FIG. 9, the dependence of the relative intensity $I/I_0$ on the amplitude of the driver voltage of the piezoelectric element is shown. It is shown that the course of $I/I_0$ can be described well according to the Debye-Waller theory at least up to a driver voltage amplitude of approximately 3 V.

As an essential result, it can accordingly be determined that the measured intensity of a Bragg reflection is a measure for the average deflection of the elastic elements. Thus, by measuring the intensity of a single Bragg reflection, the average deflection of the elastic elements can be estimated.

FIG. 10 again shows the relevant intensity values $I/I_0$ as a function of the driver frequency in a force sensor with 80×80 columns. In the same graph, the relevant intensities are shown for different deflection orders, namely (0,0), (1,0), (2,0) and (3,0). Herein, it is apparent that the drops in the relative intensity become more pronounced, the higher the order of diffraction is. Obviously, the Bragg reflections of higher order are more sensitive to disorder or deviations from the periodic structure. This suggests that Bragg reflections of higher order are particularly suitable for detecting the average deflection.

Figure 10:
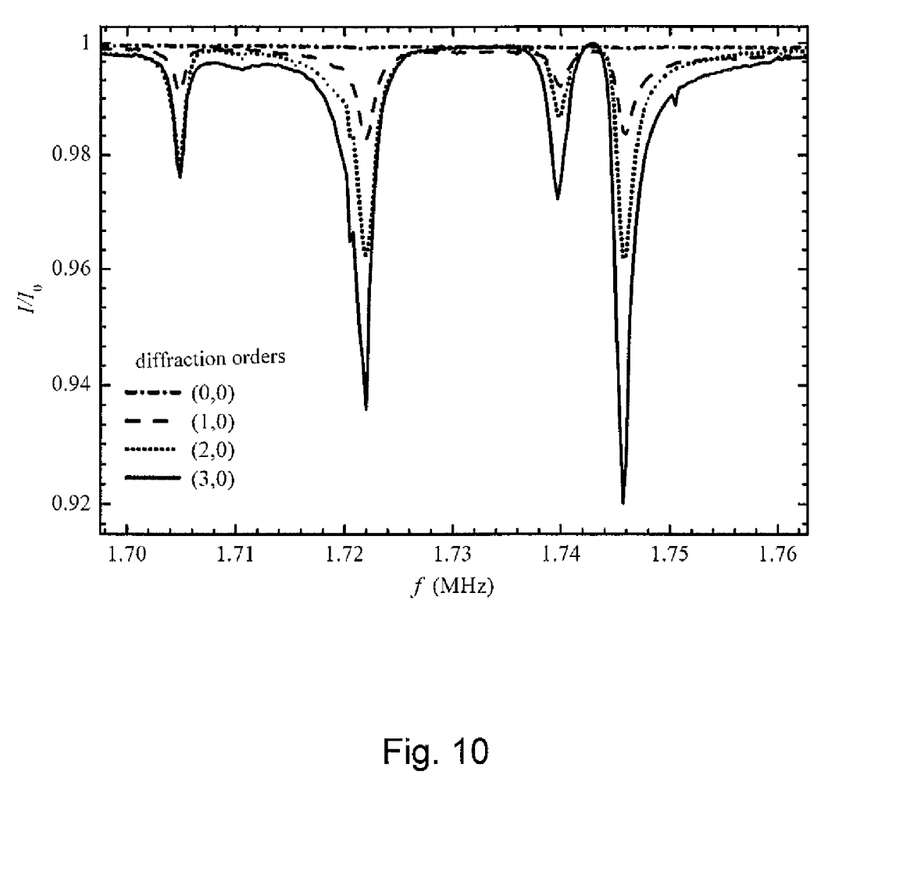
FIG. 10 shows the relative intensity $I/I_0$ of a Bragg reflection as a function of the driving frequency of a piezoelectric element for different Bragg reflections.

Second, it is apparent that the force sensor obviously does not have just one resonant frequency, but rather a plurality of resonant frequencies. This indicates that the individual columns 22 of the force sensor 24 are coupled, so that the force sensor 24, as an overall system of coupled oscillators, has a multitude of vibration modes. The resonances of these overall vibration modes are substantially sharper in this case than the resonance of an individual column of the same type. The inventor assumes that the columns 22 are coupled to one another via the ambient air, and that different vibration modes are created in this manner.

Figure 11:
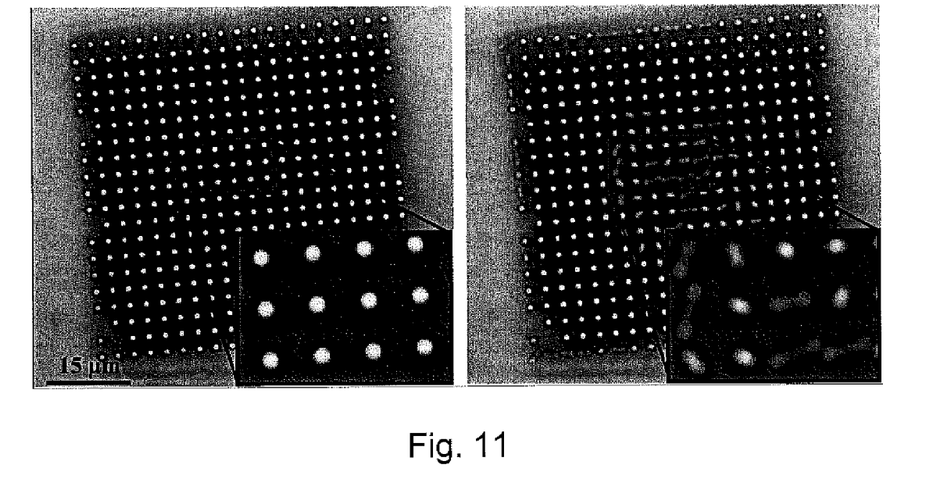
FIG. 11 shows an optical image of the plan view onto a force sensor, and FIG. 12 on the left shows the total amplitude of the vibrations of a 6×7 column section of a force sensor, determined from a real optical image, and on the right shows the same data compared to the result of the determination of vibration amplitudes via intensity of Bragg reflexes.

The inventor was able to verify that the detection of the vibration amplitudes via the Bragg intensities actually correctly reproduces the vibration behaviour of the force sensor 24. In FIG. 11, the left image shows an optical picture of the plan view onto a force sensor 24, in which the columns 22 are (virtually) at rest, because the force sensor is formed with a frequency which does not correspond to a natural frequency mode of the force sensor. The right image in FIG. 11 shows the same view in a state in which the force sensor 24 is resonantly excited by a shear piezo element (not shown). In both cases, the substrate 25 is connected in a force-fitting manner to a surface of the shear piezo element and is moved back and forth by means of the same in the substrate plane with a certain driver frequency. As can be seen from the right image of FIG. 11, the movement of the force sensor 24 with the resonant frequency leads to the excitation of a vibration mode in which a portion of the columns 22 vibrate with differently sized amplitudes, whereas the other columns 22 remain in the rest position. In both images, a part region is illustrated in an enlarged manner.

With specifically developed image processing programs, it is possible to determine the amplitude of the vibrations on the basis of such a real optical image. As the computing outlay is relatively large however, this calculation was only applied to a 6×7 column part region of a 60×60 column field (not shown).

Figure 12:
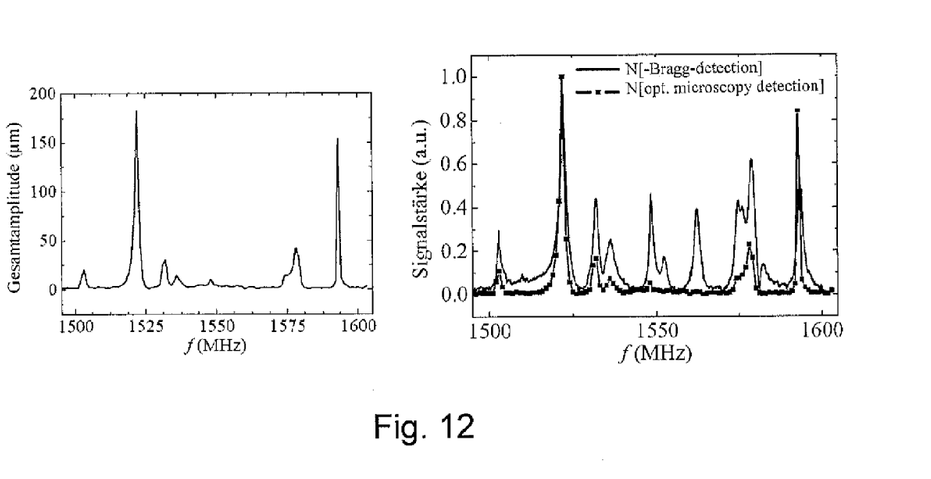

Shown in the left image of FIG. 12 is the overall amplitude of the vibrations as a function of the driver frequency of the 6×7 column section mentioned. As mentioned, one is concerned here with vibration amplitudes which have been read out of a sequence of actually recorded "real" or "real optical" images of the section of the force sensor 24.

The right image of FIG. 12 shows the same overall amplitude spectrum compared to the corresponding spectrum which results from the measurement using the Bragg intensities. Therein one can see that using the Bragg intensities, all resonances, which were determined in the direct optical observation of individual columns, are likewise detected. Furthermore, the right image of FIG. 12 shows that with the aid of the intensities of the Bragg reflections, it was possible to detect further resonances which could not be detected in the direct optical measurement. The reason for this is that in the optical detection, only the 6×7 column section of the column field was observed, whereas in the Fourier space, the diffraction pattern of the entire 60×60 column-sized sensor was detected. As certain vibration modes are localised in certain regions of the force sensor 24, which can even be seen from FIG. 11, and is confirmed by further pictures not shown here, it is understandable that such vibration modes were overlooked in the optical detection of only a part region of the force sensor, in which the columns in the monitored part region are not or only slightly deflected.

As a whole, FIG. 12 confirms that the determined intensity drops in a Bragg reflection correlate exactly with the resonances of the columns 22, i.e. with increased average deflections of the columns 22.

Figure 3:
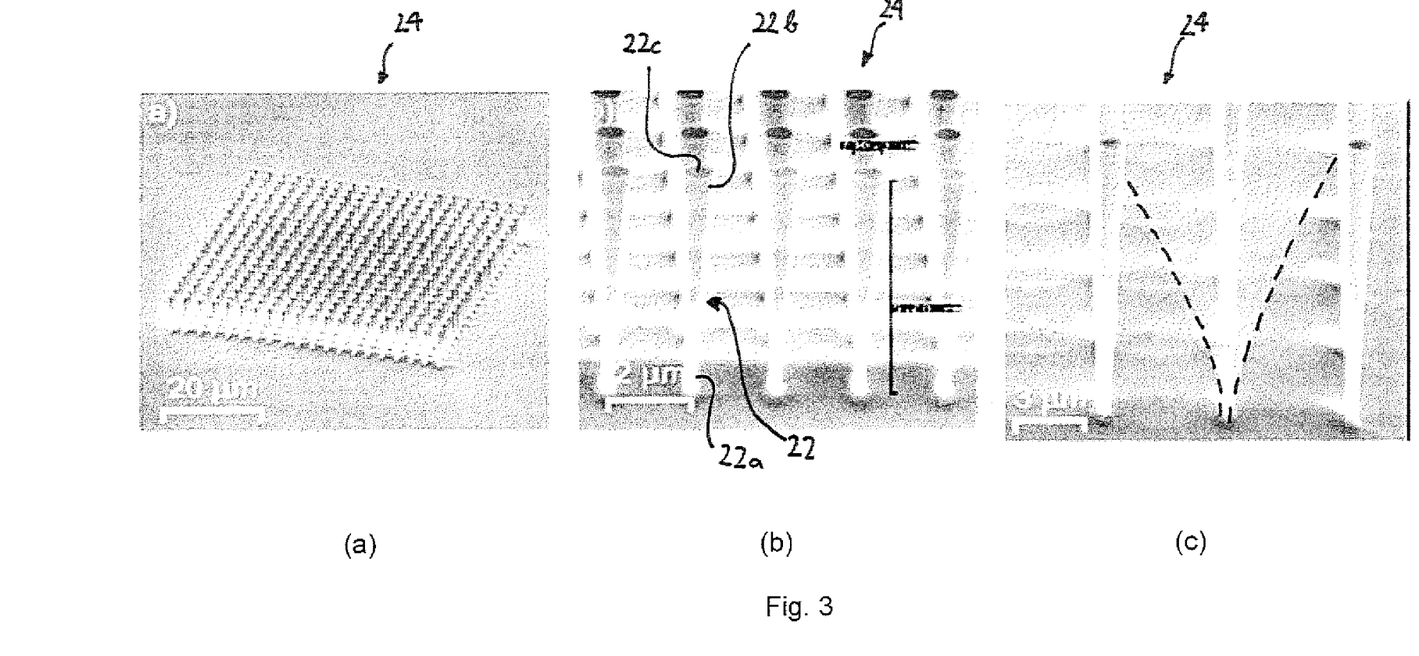

A column sensor 24 of the type shown in FIG. 3 can also be used as a mass sensor in an alternative embodiment. To this end, the end faces 22c at the upper ends 22b of the columns 22 are coated in such a manner that particles can be deposited thereon. Depending on the mass of the deposited particles, the resonances in the spectrum of FIG. 10 shift, so that it is possible to deduce the mass of the deposited particles from the changed spectrum. In this manner, a novel, very sensitive mass detector is provided. A particular and surprising result here is the fact that the resonances of the mass sensor as a system made up of coupled elastic elements are substantially narrower spectrally or have a higher quality factor than would have been expected from the resonance of an individual elastic element. Thus, a mass sensor 24 which consists of a multitude of closely arranged columns 22 in particular has proven exceptionally sensitive and accurate.

In one embodiment, the end faces 22c at the upper ends 22b of the columns 22 can also be functionalised in such a manner that only certain particles or groups of particles are selectively deposited. In this case, a change of the spectrum can be monitored and used in order to estimate the concentration of the particles. The higher the concentration of the particles to be detected, the larger is the portion of columns 22 on which the particles are actually deposited, and the more noticeable this becomes in the spectrum. The spectra corresponding to certain concentrations can be determined in calibration measurements, and the determined spectra can be compared with the calibration spectra during actual use, in order to deduce the concentration.

The particular advantages of the fluted column shape, in which the end faces 22c are larger than the lower ends 22a, can also be seen in this embodiment. Due to the fluted shape, it is relatively easily possible to functionalize the end faces 22c only, for example by means of vapour deposition or stamping, so that the spring hardness of the columns is not changed by the functionalization. The fluted shape further allows a comparatively large active area, which promises a higher yield with respect to the deposition, which is a statistical process. In addition, the end face 22c is also therefore the ideal location for the deposition of the particles to be detected, because the additional mass in the region of the end face 22c will have the greatest influence on the resonant frequency.

In the case of use as a mass sensor, too, a large number of elastic elements is advantageous in order to obtain improved statistics. With the method described here, at least the average deflection can be determined very simply and nonetheless precisely, even in the case of a very large number of elastic elements.

The described features can be of importance in any desired combinations.

LIST OF REFERENCE NUMBERS

10 Cell
12 Extra-cellular matrix
14 Cell nucleus
16 Microtubules
18 Actin cortex
20 Nanostructure
22 Column
22a Lower end of column 22
22b Upper end of column 22
22c End face of column 22
24 Force sensor
25 Substrate 26 Device for detecting the deflection of columns 22
28 Receptacle
30 Light source
32 CCD camera
34 Virtual monitor
36 Control

The invention claimed is:

1. A method for detecting the deflection of a plurality of elastic elements, wherein
the elastic elements can be deflected out of a rest position against a restoring force and
the elastic elements are arranged periodically,
wherein the arrangement of the elastic elements is illuminated using light, the coherence length of which is larger than the average spacing of adjacent elastic elements,
a diffraction image is generated of the illuminating light scattered by the arrangement of elastic elements,
at least a portion of the diffraction image is detected by an optical sensor directly or after interaction with further optical components, and
the detected image or measurement signal is analysed further in order to determine information relating to the deflection state of the elastic elements therefrom.

2. The method according to claim 1, in which the elastic elements are suitable as resonators or for measuring a force acting on a respective elastic element.

3. The method according to claim 1, wherein the elastic elements are formed by column-like elements, which are each fastened with a lower end on a substrate and have an upper free end, and
said diffraction image is formed by the light scattered on the upper ends of the column-like elements.

4. The method according to claim 1, in which the intensity of at least one Bragg reflection of at least first order is determined and used to estimate the average deflection of the elastic elements.

5. The method according to claim 1, in which the deflection takes place due to resonant excitation.

6. The method according to claim 2, in which biological cells or small organisms are located on or between the column-like elements, and in which the average deflection is estimated in order to determine one or both of the activity and vitality of the cells or small organisms.

7. The method according to claim 4, in which the average deflection of the elastic elements is estimated in order to detect at least one resonance of vibrations of elastic elements.

8. The method according to claim 7, in which whether and/or to what extent particles are deposited on the elastic elements is determined on the basis of the at least one resonance.

9. The method according to claim 3, in which whether or to what extent particles are deposited on the upper ends of the column-like elements is determined on the basis of at least one resonance, wherein at least the end face of the upper ends of the column-like elements is preferably coated with a material, on which predetermined particles may selectively deposit.

10. The method according to claim 8, in which at least one resonant frequency is detected, and the mass of deposited particles is determined on the basis of the at least one detected resonant frequency.

11. The method according to claim 1, in which the diffraction image of at least first order is transformed with the aid of a Fourier optical system into an image of the arrangement of elastic elements.

12. The method according to claim 3, in which the cross section of the column-like elements is larger at the upper end than at the lower end.

13. The method according to claim 3, in which the cross section of the column-like elements is larger at the upper end than at the lower end, wherein the column-like elements have the shape of a truncated cone standing on the narrow end, the-half opening angle of which, defined as the angle between the cone axis and enveloping line, is between 0.1° and 7°.

14. The method according to claim 3, in which the following applies for the spring constant k of the column-like elements:

$$k = \frac{F}{\Delta x} \leq 10 \text{ mN/m, preferably} \leq 1 \text{ mN/m,}$$

wherein $\Delta x$ is the deflection of the upper end of the column-like elements in the horizontal direction and F is a horizontal force which acts on the upper end of the column-like elements.

15. A device for detecting the deflection of a plurality of elastic elements of a sensor, which can be deflected out of a rest position against a restoring force, said device comprising:
a receptacle for accommodating a sensor,
a light source, which is or can be arranged such that it can illuminate a sensor arranged in or on the receptacle in such a manner that a diffraction image is created by light scattered at the elastic elements,
an optical sensor, particularly an image sensor, which is suitable for receiving at least a portion of the diffraction image or an image which was produced by interaction of the diffraction image with further optical components, and
a control which is suitable for determining information relating to the deflection state of the elastic elements of the sensor from the received image or image portion.

16. The device according to claim 15, in which the control is configured to determine the intensity of at least one Bragg reflection of at least first order and estimate the average deflection of the elastic elements therefrom.

17. The device according to claim 15, in which the control is configured to detect at least one resonance of vibrations of elastic elements on the basis of the average deflection of the elastic elements.

18. The device according to claim 15, in which said further optical component comprises a Fourier optical system which is arranged to convert the diffraction image into a real image of the arrangement of elastic elements.

19. The device of claim 15, in an apparatus for determining cell forces or forces of small organisms, said apparatus further comprising:
a cell force sensor which comprises a plurality of column-like elements each fastened at their lower end on a substrate and having an upper free end.

20. The device of claim 15, in an apparatus for determining one of the mass and the concentration of particles, said apparatus further comprising:
a mass sensor comprising a plurality of column-like elements, each fastened at their lower end on a substrate and having an upper free end, wherein the upper ends of the columns are suitable or functionalised for the deposition of particles to be detected.

* * * * *